May 19, 1931.   F. H. HOWLETT   1,805,546

PLANER

Filed Feb. 19, 1930   2 Sheets-Sheet 1

INVENTOR.
Frank H. Howlett.
BY
ATTORNEYS.

May 19, 1931.  F. H. HOWLETT  1,805,546
PLANER
Filed Feb. 19, 1930   2 Sheets-Sheet 2

INVENTOR.
Frank H. Howlett.
BY Townsend, Loftus & Ablett
ATTORNEYS.

Patented May 19, 1931

1,805,546

UNITED STATES PATENT OFFICE

FRANK H. HOWLETT, OF OAKLAND, CALIFORNIA, ASSIGNOR TO FRED WOLFSOHN, OF SAN FRANCISCO, CALIFORNIA

PLANER

Application filed February 19, 1930. Serial No. 429,631.

This invention pertains to planers and especially to a small portable type of planer commonly used in the art of dentistry for trimming plaster casts and the like, as is shown in my co-pending application entitled "Planer" filed November 17, 1928, Serial No. 320,199.

It is the object of my present invention to generally improve the construction and operation of such planers by the provision of an improved type of planer head and driving means therefor.

I attain this object through the combination with a base member and an adjustable work table supported thereby, of a pivoted planer head carrying a planer blade and adapted to be oscillated about its pivot so that the blade will come into contact with and impart a shearing cut to the work supported upon the table. Further objects and advantages of my invention will become apparent through an understanding of the accompanying drawings and specifications in which I have shown and described a preferred embodiment thereof.

Figure 1:
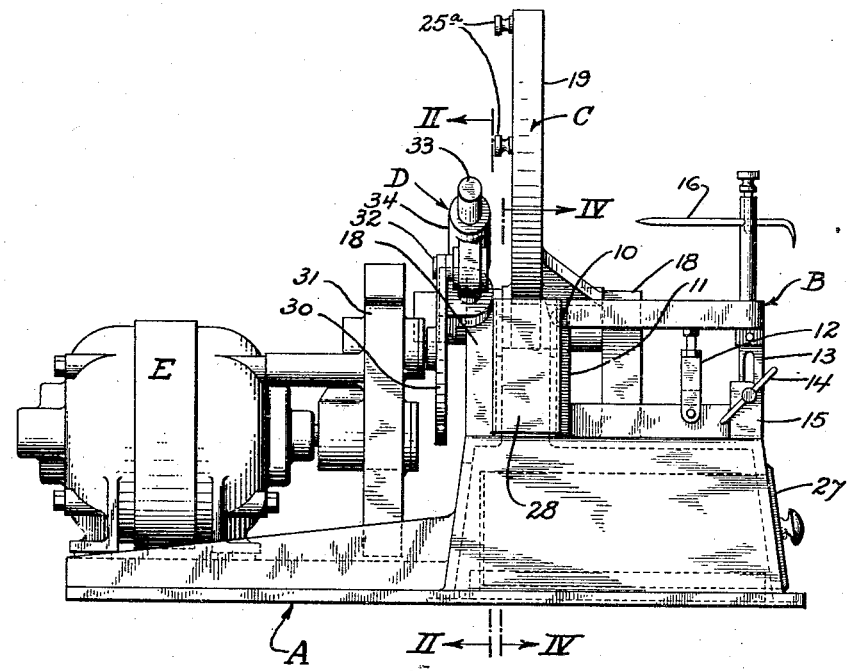
Fig. 1 is a side elevation of a planer.
Figure 3:
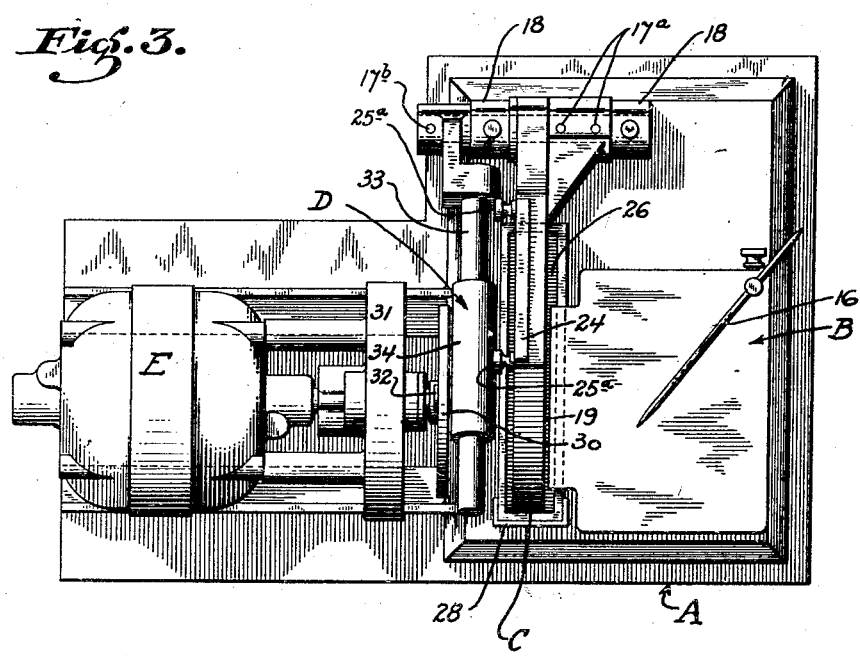
Fig. 3 is a plan view of the planer shown in Fig. 1.

Referring more particularly to the drawings and especially to Figs. 1 and 3, I show a base A upon which is supported a work table B, a planer head C, a driving mechanism D, and a suitable source of power shown in the form of an electric motor E.

The work table B is made adjustable by means identical to those shown in my above named co-pending application. The table is pivotally secured at its forward end as at 10 to lugs 11 formed upon the base. The other end is supported so that the table assumes its normal horizontal position, by a pivotal arm 12 and may be supported in any desired angular position by means of a link 13 depending from its underside and adapted to be engaged by a clamping screw 14 carried by a lug 15 extending upwardly from the base. The table is also provided with an adjustable scribe 16 for guiding the work as it is fed to the planer.

Figure 4:
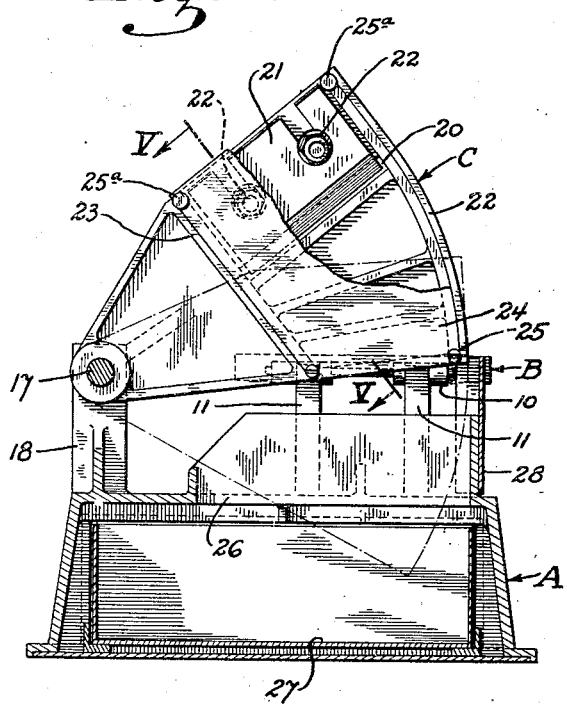
Fig. 4 is a sectional view taken on the line IV—IV of Fig. 1.
Figure 5:
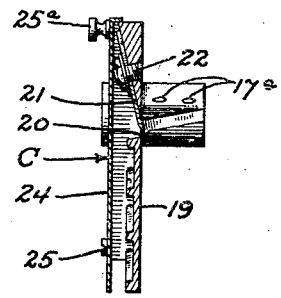
Fig. 5 is a sectional view of the planer head taken on the line V—V of Fig. 4.

The planing mechanism consists of the planer head C secured to a shaft 17 by means of a key or pin as shown at 17a. The shaft 17 is journalled in a pair of bearing lugs 18 formed upon the base A. It will be seen that oscillatory movement of the shaft 17 will impart like movement to the planer head secured to it, or in other words cause the planer head to move up and down in front of the table B. The side of the planer head adjacent the table is provided with a smooth surface or planer face 19 and has a slot 20 formed therein through which a blade 21 extends. The blade 21 is disposed at an angle to the planer face 19 through which it extends and is secured to the back of the planer head by means of bolts shown at 22 in Figs. 4 and 5. The planer head has a pair of flanges 23 formed on either side of the blade 21, and a removable back cover 24 is held against these flanges by means of two ordinary screws 25 engaging the slots in the lower edge of the cover 24 and thumb screws 25a passing through holes in its upper edge. The flanges 23 and the back 24 co-operate in forming a dust receiving chamber adjacent the back of the blade 21. The cover forms a closure for the top and back of this chamber and the bottom end is left open, so that dust or shavings thrown into the chamber from the blade will be allowed to fall through an opening 26 formed in the base A into a suitable drawer contained by the base such as is shown at 27. A guard 28 surrounds the opening 26 to prevent scattering of the dust as it falls from the planer head into the drawer 27.

In order to remove the cover 24 for the purpose of cleaning the dust receiving chamber, it is merely necessary to unscrew the thumb screws 25a and lift the cover up as the screws 25 pass through slots in the cover that are open at the lower end and consequently permit its removal when the thumb screws are released.

Oscillatory motion is imparted to the planer head in the following manner. The motor E supported by the base member rotates a crank disk 30 through suitable reduction gearing incased in the housing shown at 31. A crank pin 32 is mounted on the crank disk 31 and a round rod or lever 33 is secured at one end to the shaft 17, which carries the planer head. The other end of the lever 33 extends through a sleeve 34 which is pivotally mounted on the crank pin 32.

It will be understood from the description so far that the crank disk when rotating carries the sleeve 34 mounted on the crank pin with it. As the lever 33 extends through the sleeve it may be seen that it is caused to oscillate by the rotary motion of the crank disk. The lever and the planer head being both secured to the common shaft 17, it is apparent that the oscillation of the lever will also cause the planer head to oscillate.

Figure 2:
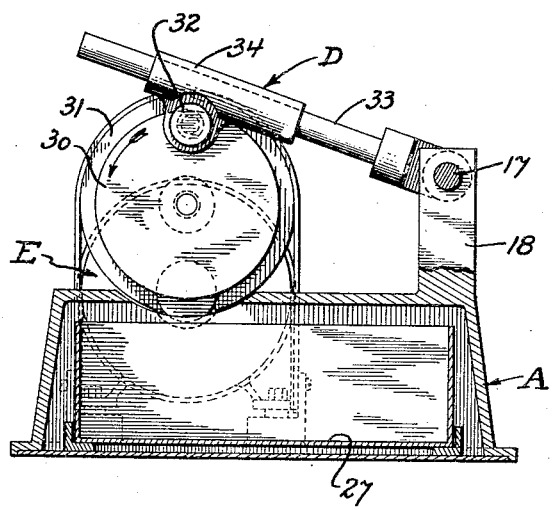
Fig. 2 is a sectional view taken on the line II—II of Fig. 1.

Among the advantages of the driving mechanism shown is the fact that it imparts a slow, powerful motion to the planer head on its downward or cutting stroke and causes it to rise quickly. This may be best illustrated by referring to Fig. 2 in which the crank pin 32 and the lever 33 are shown in their uppermost positions. The arrow in this figure indicates the direction of rotation of the crank disk and shows that on its downward stroke the crank pin moves away from the shaft 17 causing the sleeve 34 to slide toward the outer end of the lever 33, while on the upward stroke the sleeve is caused to slide inwardly upon the lever. As it is true that lever action increases in proportion to the distance from the fulcrum at which the force is applied, it is apparent that the downward stroke of the planer head will be slower and more powerful than the upward stroke. This is particularly desirable as it is on the downward stroke that the blade performs it cutting operation while no work is being done on the upward stroke.

While I have shown a preferred embodiment of my invention, it should be understood that various changes may be resorted to in the design and arrangement of its several parts without departing from the spirit and scope of the appended claims.

Having thus described my invention, what I claim and desire to secure by Letters Patent is:

1. In a device of the character described a pivotally mounted planer head having a planer face thereon and a blade extending through said face, driving means for causing said planer head to oscillate, said means varying the ratio of power transmitted to said planer head during its oscillatory strokes.

2. In a planer of the character described, a normally horizontally disposed work supporting table, a vertically oscillating planer head adjacent said table, a blade carried by said planer head and adapted to cut work supported by the table on the downward stroke of the planer head, driving means for said planer head, and a variable speed power transmission connecting said head and driving means whereby the ratio of power transmission will automatically become greater upon the downward stroke of the planer head and less on the upward stroke.

3. In a device of the character described, a planer head secured to a pivoted shaft, a lever also secured to said shaft, a rotatable crank disk having a crank pin thereon, and means connecting said crank pin and said lever whereby rotation of said crank disk will impart oscillatory motion to said lever and said planer head.

4. In a device of the character described, a planer head secured to a pivoted shaft, a lever also secured to said shaft, a rotatable crank disk having a crank pin thereon, a sleeve member journalled on said crank pin and slidably engaging said lever whereby rotation of said crank disk will impart oscillatory motion to said lever and said planer head, and means for rotating said crank disk.

5. In a device of the character described a planer head secured to a pivoted shaft, a lever also secured to said shaft, a rotatable crank disk disposed parallel to said shaft, a crank pin carried by the crank disk for rotating the crank disk and a sleeve journalled on said crank pin and slidably engaging said lever whereby rotation of said crank at a constant speed will cause said lever, and consequently said planer head, to oscillate quickly in one direction and relatively slow in the opposite direction.

FRANK H. HOWLETT.